(12) United States Patent
Utukuri et al.

(10) Patent No.: US 10,627,973 B2
(45) Date of Patent: Apr. 21, 2020

(54) SYSTEMS AND SENSORS FOR SENSING AND TRACKING RADIATION BLOCKING OBJECTS ON A SURFACE

(71) Applicant: Baanto International Ltd., Mississauga (CA)

(72) Inventors: Avanindra Utukuri, Mississauga (CA); Jonathan Clarke, North York (CA); Allen Rego, Mississauga (CA)

(73) Assignee: Baanto International Ltd., Mississauga, Ontario (CA)

( * ) Notice: Subject to any disclaimer, the term of this patent is extended or adjusted under 35 U.S.C. 154(b) by 0 days.

(21) Appl. No.: 15/894,563

(22) Filed: Feb. 12, 2018

(65) Prior Publication Data

US 2018/0164926 A1    Jun. 14, 2018

Related U.S. Application Data

(63) Continuation of application No. 13/379,476, filed as application No. PCT/CA2010/000961 on Jun. 18, 2010, now abandoned.

(60) Provisional application No. 61/320,334, filed on Apr. 2, 2010, provisional application No. 61/218,124, filed on Jun. 18, 2009.

(51) Int. Cl.
    *G06F 3/046*      (2006.01)
    *G01V 8/20*      (2006.01)
    *G06F 3/042*      (2006.01)

(52) U.S. Cl.
    CPC ............... *G06F 3/046* (2013.01); *G01V 8/20* (2013.01); *G06F 3/0428* (2013.01)

(58) Field of Classification Search
    CPC .......... G06F 3/046; G06F 3/0428; G01V 8/20
    See application file for complete search history.

(56) References Cited

U.S. PATENT DOCUMENTS

| | | | |
|---|---|---|---|
| 4,507,557 A * | 3/1985 | Tsikos | G06F 3/0428 250/221 |
| 5,107,253 A | 4/1992 | Meadows | |

(Continued)

FOREIGN PATENT DOCUMENTS

| | | |
|---|---|---|
| CN | 101174191 A | 5/2008 |
| CN | 101517521 A | 8/2009 |

(Continued)

OTHER PUBLICATIONS

International Search Report for PCT/CA2010/000961, published Oct. 25, 2010.

(Continued)

*Primary Examiner* — Wing H Chow

(57) ABSTRACT

Several systems for tracking one or more radiation blocking objects on a surface are disclosed. A pair of radiation sensors are provided adjacent the surface and a plurality of radiation sources are provided adjacent the surface. Radiation from at least some of the radiation sources travels across the surface to reach each of the radiation sensors. One or more radiation blocking objects on the surface attenuate radiation from one or more radiation sources from reaching each of the sensors. The position of the one or more radiation blocking objects is estimates and may be tracked based on the position of the one or more attenuated radiation sources relative to each radiation sensor.

27 Claims, 11 Drawing Sheets

(56) References Cited

U.S. PATENT DOCUMENTS

| | | | |
|---|---|---|---|
| 5,317,140 A | 5/1994 | Dunthorn | |
| 6,429,857 B1 | 8/2002 | Masters et al. | |
| 7,439,291 B2 | 10/2008 | Wang et al. | |
| 2002/0075243 A1 | 6/2002 | Newton | |
| 2004/0021645 A1 | 2/2004 | Kobayashi et al. | |
| 2005/0200613 A1* | 9/2005 | Kobayashi | G06F 3/0416 345/175 |
| 2006/0010400 A1 | 1/2006 | Dehlin et al. | |
| 2009/0058833 A1* | 3/2009 | Newton | G06F 3/0421 345/175 |
| 2009/0066662 A1 | 3/2009 | Liu et al. | |
| 2009/0135162 A1 | 5/2009 | Van De Wijdeven et al. | |
| 2010/0066016 A1* | 3/2010 | Van De Wijdeven | G06F 3/0421 273/237 |

FOREIGN PATENT DOCUMENTS

| | | |
|---|---|---|
| EP | 1128318 A2 | 8/2001 |
| EP | 1 615 109 A2 | 1/2006 |
| JP | S61254805 A | 11/1986 |
| JP | H07261911 A | 10/1995 |
| JP | 2000284896 A | 10/2000 |
| JP | 2001265515 A | 9/2001 |
| JP | 2006301740 A | 11/2006 |
| JP | 3952896 B2 | 8/2007 |
| JP | 2008052366 A | 3/2008 |
| JP | 2008250897 A | 10/2008 |
| JP | 2009116822 A | 5/2009 |
| JP | 4335468 B2 | 9/2009 |
| WO | WO01/63550 A2 | 8/2001 |
| WO | WO02/082253 A2 | 10/2002 |
| WO | WO2004/072843 A1 | 8/2004 |
| WO | WO2008/032270 A2 | 3/2008 |

OTHER PUBLICATIONS

English machine translation of abstract of CN101174191, published May 7, 2008.
McAvinney, P: "Vision Based Gesture Recognition Systems", NCGA Conference Proceedings, vol. 1., Mar. 19, 1990, pp. 304-313, XP000676870.

* cited by examiner

SYSTEMS AND SENSORS FOR SENSING AND TRACKING RADIATION BLOCKING OBJECTS ON A SURFACE

FIELD

The described embodiments relate to systems, methods and sensors for sensing and tracking the position of one or more radiation blocking objects on a surface.

BACKGROUND

A variety of computer input and other devices require tracking of one or more objects such as fingers, styluses, pens or other objects as they positioned on or moved across a surface. For example, computer monitors and other display screens may be fitted with a touchscreen that allows a user to provide inputs to a computer using a finger or a stylus, as they are moved across the display surface of the screen. Similarly, a whiteboard may be fitted with a pen positioning sensing system that tracks the position of one or more pens as they are moved across the writing surface of the whiteboard.

Existing systems suffer from a variety of deficiencies, including excessive complexity and cost, high computational overhead that affects both their accuracy and response time, and other deficiencies.

SUMMARY

The present invention provides various systems for detecting the presence and position of one or more radiation blocking objects as the radiation blocking objects are positioned on or moved across a surface. The surface may be any type of surface such as the display surface of computer monitor or other display device, a writing surface such as a whiteboard, bulletin board, sheet of paper or wall or another surface such as a part of a toy or game.

Various embodiments according to a first aspect of the invention include a frame or housing with a plurality of radiation sources and radiation sensors mounted on it. The frame will typically, but not necessarily, be mounted to or be combined with a housing, frame or support of an underlying system such as a whiteboard, a display monitor, a bulletin board, a game, toy or other device. In some embodiments, the frame or housing may be combined with a display monitor to form a touchscreen. A controller activates some or all of the radiation sources sequentially. The radiation sources may be activated in a sweep fashion from one side of the frame to the other, or they may be activated in a different order. While each radiation source is activated, the radiation incident on some or all of the radiation sensors is measured.

A radiation blocking object present within the frame will typically block or attenuate one or more of the paths between some of the radiation sources and some of the radiation sensors. By successively measuring the attenuation of radiation from such blocking, the position of the radiation blocking object is estimated.

In embodiments according to another aspect of the invention, one or more diffusers are used to diffuse radiation emitted by the radiation sources. The diffusers may allow the position of a radiation blocking object to be estimated more accurately, particularly when the radiation blocking object blocks two or more of the paths between the radiation sources and a radiation sensor.

In some embodiments, radiation emitted by the radiation sources is modulated at a modulation frequency or with a modulation pattern. The sensors are sensitive to the modulation frequency or pattern and ignore radiation that is not modulated according the frequency or pattern, reducing the effect of ambient and other spurious radiation in estimating the position of a radiation blocking object.

In one aspect, a system for sensing the position of one or more radiation blocking objects on a surface is provided. The surface is mounted to or within a frame, and in some embodiments, the surface and frame are generally rectangular. Radiation sources are provided on the frame and emit radiation across the surface. Radiation sensors are provided at two or more positions on the frame. Each sensor is positioned such that radiation from a plurality of the radiation sources may be incident on each the sensor. Each sensor provides a radiation intensity level corresponding to the intensity of radiation incident on it to a controller. The controller is coupled to the radiation sources and sequentially activates the radiation sources. As each radiation source is activated, radiation from the radiation source may be incident on some or all of the radiation sensors. The controller samples the radiation intensity level from the radiation sensors. When a radiation blocking object is present on the surface, the radiation blocking object will typically block or attenuate radiation from one or more of the radiation sources. The controller identifies radiation sources for which the radiation intensity signal is attenuated compared to a baseline or threshold intensity level.

The controller estimates the position of the radiation blocking object based on the position of the attenuated radiation sources (i.e. radiation sources for which the radiation intensity level is attenuated due to the presence of a radiation blocking object) as measured from each radiation sensor. The controller first estimates an angular direction of the radiation blocking object relative to at least two of the radiation sensors. The angular directions are combined to estimate the position of the radiation blocking object on the surface relative to a reference position.

In some embodiments, the controller combines the radiation intensity levels samples from a radiation source into a radiation intensity signal and identifies ranges of attenuated radiation sources. A center radiation source within the range is identified, and the angular position of the radiation blocking object relative to at least one of the radiation sensors is estimated based on the center radiation source in each radiation intensity signal.

In other embodiments, the relative attenuation of radiation intensity signals may be combined to estimate the position of the radiation blocking object. For example, if a range of radiation intensity levels corresponding to a range of radiation sources are attenuated by a radiation blocking object, a weighted average based on the relative attenuations and positions of each radiation source is used to refine the estimated angular position of the radiation blocking object relative to each radiation sensor. The refined estimate angular positions are combined to provide an estimated position of the radiation blocking object relative to the reference position.

In some embodiments, multiple radiation blocking objects on the surface may be sensed. The controller analyzes radiation intensity signals from each of the radiation sensors to identify attenuated radiation intensity levels corresponding to the presence of one or more radiation blocking objects. The maximum number of radiation blocking objects identified in any one radiation intensity signal is assumed to be the minimum number of radiation blocking objects present on the surface. The controller estimates an angular direction for each radiation blocking object apparently visible from each radiation sensor, relative to the sensors. The angular positions are combined to estimate the position of each radiation blocking object. The prior positions of radiation blocking objects, when such prior positions are known, may be used to select likely current positions of radiation blocking objects when the angular directions can lead to different estimates. For example, in some embodiments, two angular directions are identified relative to each of two radiation sensors. The angular directions can be represented as lines originating from each of the sensors. The lines intersect at four points, which may be considered in pairs to be potential positions of two radiation blocking objects. Previously known positions for one or both radiation blocking objects are used by calculating the shortest movement required from the previous positions of the radiation blocking objects to the potential current positions based on the intersections. The radiation blocking objects are deemed to be located at the potential position that requires the shortest movement. In other embodiments, other criteria may be used to resolve between different potential positions. For example, the trajectory of a radiation blocking object over a preceding time period, a distance or number of iterations of a sensing process may be used to estimate the current position of a radiation blocking object.

These and other aspects of the invention are described below in a description of the some example embodiments of the invention.

BRIEF DESCRIPTION OF THE DRAWINGS

Various embodiments of the invention will now be described with reference to the drawings, in which.

The drawings are illustrative only and are not drawn to scale. Various elements of some embodiments may not be shown for clarity. Similar and corresponding elements of the various embodiments are identified by similar reference numerals.

DESCRIPTION OF EXEMPLARY EMBODIMENTS

Exemplary embodiments described herein provide details relating to systems and methods for determining the position of one or more radiation blocking objects in relation to various radiation sources and radiation sensors. In some embodiment, the radiation sources and sensor may be mounted in a frame. In some embodiments, the systems may include or be used with various underlying devices such as whiteboards, display monitors and other devices. In some embodiments, the systems may include or be used with an underlying surface such as a whiteboard, a wall, the surface of a display screen or any other generally planar surface. The radiation sources may emit radiation in the visible light spectrum or in other spectrums, such as the ultraviolet or infrared spectrums. The embodiments described herein are exemplary only and other implementations and configurations are also possible.

Figure 1:
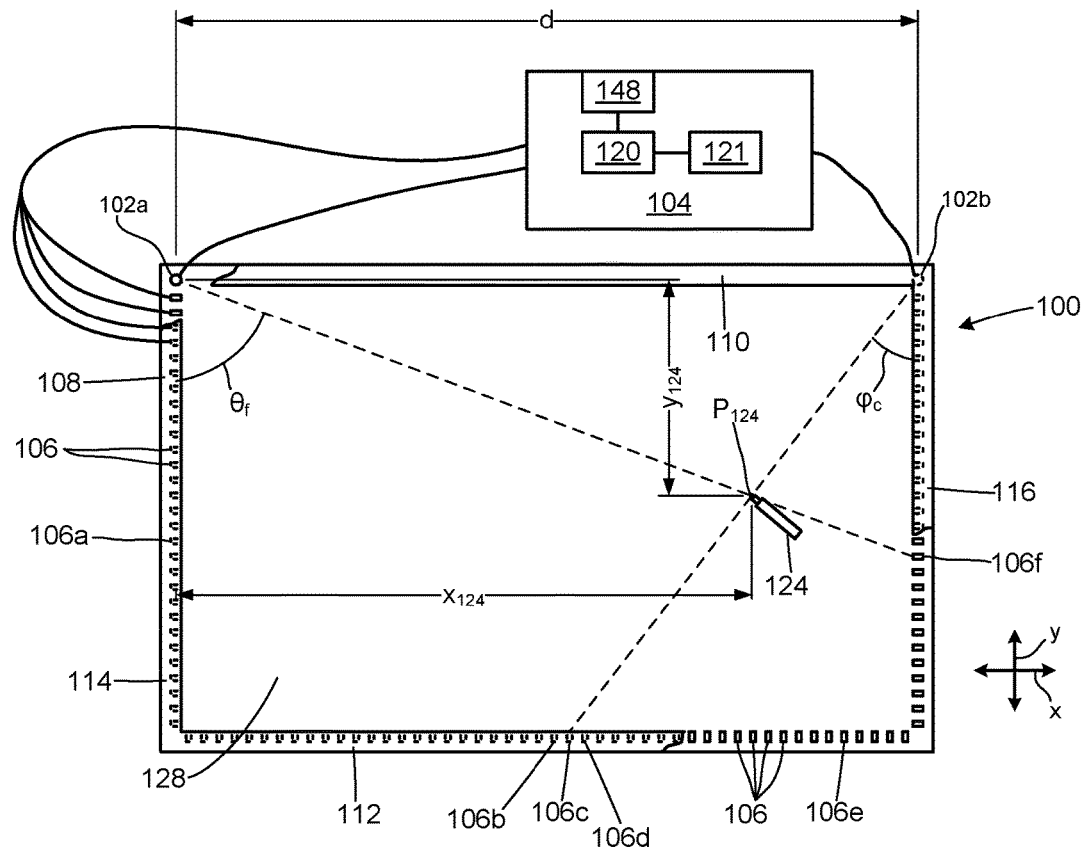
FIG. 1 illustrates a first system according to the present invention.

Reference is first made to FIG. 1, which illustrates a system 100 for sensing or estimating the position of a radiation blocking object 124. System 100 includes a pair of radiation sensors 102a, 102b, a controller 104 and a plurality of radiation sources 106 mounted on a frame or housing 108. Frame 108 has a top side 110, bottom side 112, left side 114 and a right side 116. In this embodiment, radiation sources 106 are mounted on the left, bottom and right sides of frame 108. Radiation sensor 102a is mounted at the top left corner of the frame 108 and radiation sensor 102b is mounted at the top right corner of the frame 108.

Frame 108 surrounds a surface 128. In various embodiments, the surface 128 may be the surface of a display screen, a writing surface or another surface. In this embodiment, frame 108 provides a bezel at the edges of the surface 128. Radiation sources 106 and radiation sensors 102 are mounted within the bezel. In some embodiments, the frame may only partially surround or enclose the surface, for example, the frame may not enclose the top edge of the surface if no radiation sensors or sources are mounted adjacent the top edge. In other embodiments, the frame may support but not enclose the surface. For example, the frame may provide a support for the surface, radiation sensors and radiation sources, but may not have a bezel or other element that surrounds the surface. In other embodiments, the frame may itself provide some or all of the surface. For example, the frame may have solid surface between its edges and radiation blocking objects may be positioned on the solid surface when system 100 is in use. Typically, as in these examples, the surface will be mounted to the frame.

The top left corner of frame 108 is cut away in FIG. 1 to reveal radiation sensor 102a and several radiation sources 106. The bottom right corner of frame 108 is also cut away to reveal some of the radiation sources 106. Each radiation source 106, in this embodiment, is a LED that emits radiation in the infra-red spectrum. In other embodiments, the radiation sources may be various types of sources that emit radiation in other spectrums, including the visible light spectrum and the UV spectrum. Radiation sources 106 are mounted on frame 108 such that radiation from the radiation sources reaches one or both of the radiation sensors 102. In this embodiment, radiation sources are equally spaced along the left, bottom and right sides of frame 108. In this embodiment, frame 108 is rectangular with square corners.

The sides of frame 108 are parallel to the axes of an x-y plane. In some embodiments, the radiation sources may not be equally spaced. In some embodiments, the frame may have a non-rectangular shape.

Controller 104 includes a processor 120, which may any type of device or component capable of operating system 100, including a hardware component, a software component or a component including both hardware and software or firmware or both. For example, processor 120 may be a microprocessor, microcontroller, gate array or any type of data processing or computing device. The processor can be programmed or configured to operate system 100 and its components and to communicate with external devices. Controller 104 may also includes a memory 121, which may be accessed by processor 120. Processor 120 controls the operation of controller 104 and system 100. Instructions may be recorded in the memory 121, and may be loaded into the processor to configure the processor to perform control, data processing, data transformation and communication operations for controlling the operation of the controller 104 and the system 100 as described below. Controller 104 is coupled to each radiation source 106. Only some of these connections are illustrated in FIG. 1. Controller 104 is capable of activating each radiation source 106 independently so that when one radiation source is activated or on (i.e. emitting radiation) the remaining radiation sources are not activated or off (i.e. not emitting radiation).

In this embodiment, each radiation sensor 102 is a PIN photodiode that is capable of sensing radiation emitted by the radiation sources 106 on the two opposing sides of frame 108. Radiation sensor 102a senses radiation emitted by the radiation sources 106 on the bottom and right sides of frame 108. Radiation sensor 102b senses radiation emitted by the radiation sources 106 on the bottom and left sides of frame 108. Each radiation sensor 102 is coupled to controller 104 and provides a radiation intensity level to the controller corresponding to the intensity of radiation falling on the radiation sensor 102 at any particular time. The radiation intensity level has a relatively high value when the corresponding radiation sensor 102 is receiving radiation from a radiation source 106 and a relatively low value when the corresponding radiation sensor 102 is not receiving radiation from a radiation source 106. A series of radiation intensity levels corresponding to the radiation sources 106 may be combined or assembled into a radiation intensity signal that can be used to estimate the position of the radiation blocking object 124. This is explained below.

In other embodiments each radiation sensor may be any device that is responsive to the radiation emitted by the radiation sources and capable of providing a radiation intensity level corresponding to radiation incident on the sensor. For example, a light sensitive element such as a photosensor, photodiode, photocell, a solar cell or a photovoltaic cell may be used to provide radiation intensity levels. The radiation sensor may provide the output radiation intensity level in any format compatible with the controller 104, including a digital or analog format.

Controller 104 is programmed with the dimensions of frame 108, the position of each radiation source 106 and the positions of each radiation sensor 102. In this example, controller 104 is programmed with the following information:

Sensors 102a and 102b are separated by a distance d.
  Radiation sensor 102a is at the (0,0) position on the x-y plane and radiation sensor 102b is at the (d,0) position on the x-plane.

For each radiation source on the bottom or right side of the frame 108, the angle between the left side of the frame (or a line parallel to the left side of the frame, depending on the position of the radiation sensor 102a) and the path between radiation sensor 102a and the radiation source, or a value corresponding to the angle.

For each radiation source on the left or bottom side of the frame 108, the angle between the right side of the frame (or a line parallel to the right side of the frame, depending on the position of the radiation sensor 102b) and the path between radiation sensor 102b and the radiation source, or a value corresponding to the angle.

Under the control of controller 104, system 100 is operable to estimate the physical position $P_{124a}(x_{124a}, y_{124a})$ of radiation blocking object 124. In FIG. 1, radiation blocking object 124 is illustrated as a stylus. The tip of the stylus is in contact with the surface 128, at point $P_{124}$, which corresponds to the physical position $P_{124a}$ discussed here and the pixel position $P_{124d}$ discussed below.

In operation, controller 104 sequentially activates the radiation sources 106. While a radiation source 106 is activated, controller 104 samples the output from one or both of the radiation sensors 102 to obtain a radiation intensity level corresponding to the intensity of radiation incident on each radiation sensor 102. Typically, the path between the radiation source and each radiation sensor will be blocked, partially blocked (i.e. partially attenuated) or clear. In some embodiments, while a radiation source 106 is activated, the controller may only check the radiation intensity level for a radiation sensor 102 if there is a direct path between the radiation source 106 and the radiation sensor 102. For example, there is a direct path between radiation sensor 102a and the radiation sources 106 on the bottom side 112 and the right side 116 of frame 108. Similarly, there is a direct path between radiation sources 106 on the left side 114 and the bottom side 112 of the frame 108 and radiation source 102b. In other embodiments, the controller 104 may check the radiation intensity level at a radiation sensor 102 even when the activated radiation source 106 does not have a direct path to the radiation sensor.

Instructions for performing this process are recorded in memory 121. Processor 120 accesses the instructions in memory 121 an executes the instructions to perform the process described above and those described below. Processor 120 may also record data in memory 121 during the performance of this process.

In other embodiments, the specific placement of the radiation sources and radiation sensors and the shape of the frame (which need not be rectangular and may have another shape) will effect which radiation sources have a direct path to which radiation sensors.

Returning to the present embodiment, when radiation source 106a is activated, controller 104 need not sample radiation sensor 102a to obtain a radiation intensity level because there is no direct path between radiation source 106a and radiation sensor 102a that is not obstructed by other radiation sources 106. Controller 104 does sample the radiation intensity level provided by radiation sensor 102b, which will have a relatively high value indicating that the path between radiation source 106a and radiation sensor 102b is clear, or not blocked.

When radiation source 106c is activated, controller 104 samples both radiation sensors 102a and 102b. The radiation intensity level from radiation sensor 102a is relatively high, indicating that the path between radiation source 106c and radiation sensor 102a is clear. The radiation intensity level from radiation sensor 102b is relatively low, indicating that the path between radiation source 106c and radiation sensor 102b is blocked, in this example, by radiation blocking object 124.

When radiation source 106e is activated, the radiation intensity levels from radiation sensors 102a and 102b respectively indicate that the paths between radiation source 106e and radiation sensors 102a and 102b are clear.

When radiation source 106f is activated, controller 104 samples the radiation intensity level from radiation source 102a which indicates that the path between radiation source 106f and radiation sensor 102a is blocked by radiation blocking object 124. Controller 104 samples the radiation intensity level from radiation sensor 102b, which indicates that the path between radiation source 106f and radiation sensor 102a is clear.

As controller 104 sequentially activates the radiation sources and samples the radiation intensity levels corresponding to each radiation source 106, controller 104 records the outcomes as follows:

| Radiation source | Path to Radiation Sensor 102a | Path to Radiation Sensor 102b |
|---|---|---|
| ... | — | ... |
| 106a | | Clear |
| ... | ... | ... |
| 106c | Clear | Blocked |
| ... | ... | ... |
| 106e | Clear | Clear |
| ... | ... | ... |
| 106f | Blocked | — |
| ... | ... | |

Figure 2A:
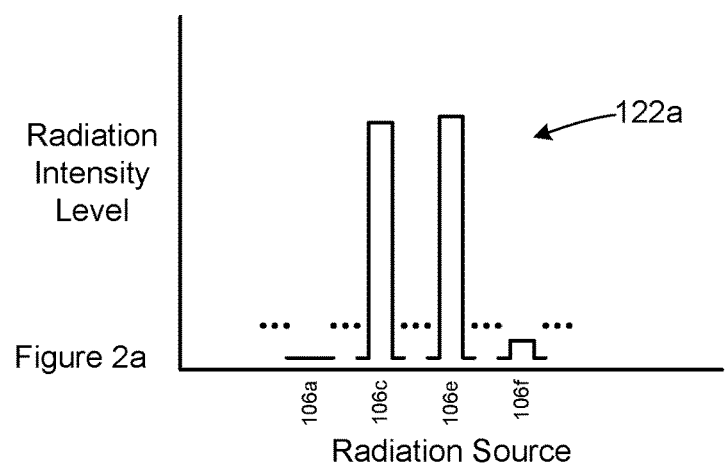
FIGS. 2a and 2b illustrate radiation intensity signals according to the system of FIG. 1.
Figure 2B:
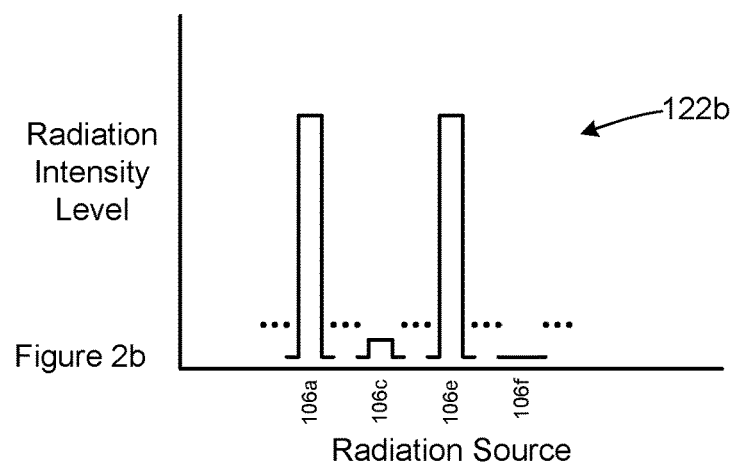

Reference is made to FIGS. 2a and 2b. FIG. 2a illustrates a radiation intensity signal 122a corresponding to the radiation intensity levels obtained by controller 104 from radiation sensor 102a. FIG. 2b illustrates a radiation intensity signal 122b corresponding to the radiation intensity levels obtained by controller 104 from radiation sensor 102b. Each radiation intensity signal comprises the output of radiation sensor 102b as the radiation sources, including radiations sources 106a, 106b, 106c and 106d are sequentially activated and then deactivated. While any one radiation source is on, the remaining radiation sources are off.

Using the radiation intensity signals 122a and 122b, controller 104 can estimate the physical position of radiation blocking object 124. Controller 104 assumes that the radiation block object 124 is located in the blocked path for each radiation sensor. In this example, the position $P_{124a}(x_{124a}, y_{124a})$ for the radiation blocking object 124 can be estimated:

$$x_{124a} = \frac{d \cdot \tan\theta_f}{\tan\theta_f + \tan\varphi_c} \quad (1)$$

$$y_{124a} = x_{124a} \cdot \tan\theta_f \quad (2)$$

In the embodiment of FIG. 1, the resolution with which the position of radiation blocking object 124 can be estimated depends on a number of factors, including the spacing between the radiation sources 106. By placing the radiation sources close to one another, a greater resolution may be achieved.

In equations (1) and (2) above, the tan of angles $\theta_f$ and $\varphi_c$ are used to calculate the position of point $P_{124}$. In system 100, the tan of the angles $\theta$ between the left side 114 and the path to the radiation sources 106 visible to radiation detector 102a, and the tan of the angles $\varphi$ between the right side 116 and path to the radiation sources 106 visible to radiation sensor 102b are recorded in a data storage location accessible to the controller 104. This allows equations (1) and (2) to be calculated without requiring the tan of each angle $\theta_f$ and $\varphi_c$ to be calculated, thereby allowing the position of $P_{124}$ to be calculated more rapidly. In other embodiments, the angles themselves may be recorded or another value corresponding to the angles may be recorded. In some embodiments multiple values corresponding to the angular relationship between each of the radiation sources, the radiation sensors and reference lines (such as lines parallel to the right and left edges of the frame) may be recorded.

System 100 may be operated in different manners, depending on the programming of controller 104.

Figure 3:
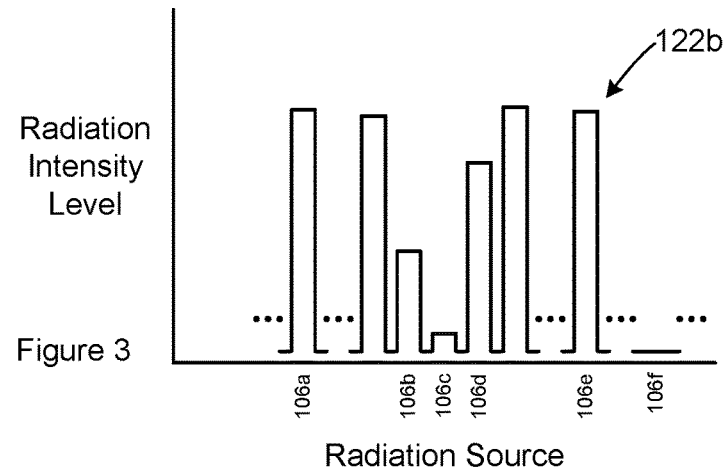
FIG. 3 illustrates a radiation intensity signal according to another embodiment.

In another embodiment, system 100 may be operated to refine the estimated positions $P_{124a}$ of a radiation blocking object on the surface 128. Reference is made to FIGS. 1 and 3. Depending on the distance between the radiation sources, the dimensions of the radiation blocking object and the distance between the radiation blocking object and a radiation sensor, the path between several radiation sources and the radiation sensor may be blocked by the radiation blocking object. For example, if radiation sources 106b, 106c and 106d are sufficiently close together, then radiation blocking object 124 may at least partially block the path between two or all three of the radiation sources and radiation sensor 102b, thereby attenuating the radiation intensity level for all three radiation sources, particularly if the radiation blocking object is close to radiation sensor 102b. In some embodiments, controller 104 determines the center radiation source in a range of radiation sources whose path to a particular radiation sensor is blocked. Optionally, the controller 104 may treat a radiation source as blocked only if its radiation intensity level is below some threshold level, providing a mechanism for including or excluding slightly attenuated radiation sources at the edges of a range of attenuated radiation sources. In this example, the center radiation source would be radiation source 106c. The controller then estimates the position of the radiation blocking object based on the angle $\theta$ or $\varphi$ between the center radiation source and the relevant side of the frame 108 (in this case, angle $\varphi$, relative to the right side 116). In other embodiments, the controller may use the middle angle $\theta$ or $\varphi$ (depending on the relevant radiation sensor) among the range of angles for the radiation sources that are blocked. If a different value corresponding to each angle relating the radiation sources to the radiation sensors is recorded in the controller 104, such as the tan of each angle, then the recorded value may be used after determining the center radiation source or angle.

The estimated position $P_{124a}(x_{124a}, y_{124a})$ is a physical position, measured in the same units as dimension d that separates radiation sensors 102a and 102b.

In some embodiments, the controller may assemble the radiation intensity signal 122 for each of the radiation sensors 102 sequentially rather than contemporaneously, as described above. For example, radiation sources visible to radiation sensor 102a may be sequentially activated and radiation intensity signal 122a may be assembled. Then radiation sources visible to sensor 102b may be sequentially activated and radiation intensity signal 122a may be assembled. This process of assembling the radiation intensity signals 122 sequentially rather than contemporaneously allows the intensity of some or all of the radiation sources 106 to be varied for the different radiation sensor 102. Referring to FIG. 1, radiation sensor 106e is closer to radiation sensor 102*b* than to radiation sensor 102*a*. It may be desirable to activate radiation source 106*e* with a higher intensity when assembling a radiation intensity signal for radiation sensor 102*a* than when assembling a radiation intensity signal for radiation sensor 102*b*.

In other embodiments, the radiation intensity signal may be assembled contemporaneously but at least some of the radiation sources may be activated at different intensities for sampling at different radiation sensors. For example, some radiation sources may be activated two or more times and different radiation sensors may be sampled during each activation. Various other combinations are possible. For example, radiation sources on the left side 108 may be activated sequentially and radiation sensor 102*b* may be sampled while each radiation source is active. Then radiation sources on the bottom side 112 may each be activated twice and each of the radiation sensors 102*a*, 102*b* may be sampled during one of the activations. Then radiation sources on the right side 116 may be activated and radiation sensor 102*a* may be sampled. The radiation intensity levels sampled from each radiation source may be assembled into a radiation intensity signal for that radiation sensor. In another embodiment, some radiation sensors visible to both of the radiation sensors may be about equally distant from each of the radiation sensors and the radiation sensors may be sampled during the same activation of such radiation sources. For example, radiation source 106*b* and some nearby radiation sources are sufficiently equally spaced from radiation sensors 102*a*, 102*b* that both radiation sensors may be sampled during a single activation of each the radiation sources.

Returning to the present embodiment, controller 104 is coupled to an interface 148, which in this embodiment is a universal serial bus port.

In other embodiments, the interface may be any type of communication interface. For example, interface 148 may be an analog interface or a digital data interface such as a serial data port or a parallel data port. In embodiments where the interface is an analog interface, the controller may provide analog signals (such as a current signal or a voltage signal) corresponding to the value of $x_{124}$ and $y_{124}$. In an embodiment where the interface is a digital interface, the controller may be configured to convert the physical positions $x_{124a}$ and $y_{124a}$ into corresponding digital positions $x_{124d}$ and $y_{124d}$ relative to the sensors 102*a* and 102*b*. The controller may be configured to provide the digital positions $x_{124d}$ and $y_{124d}$ at the interface.

In the present embodiment, the surface 128 is the surface of a LCD display screen. The LCD display screen has a resolution of X horizontal pixels by Y vertical pixels. For example, in some embodiments, the screen may have a resolution of 1280×1024 pixels or 1920×1080 pixels. In other embodiments a display screen may have any other standard or non-standard pixel resolution. Controller 104 converts the physical position a corresponding pixel position $P_{124d}(x_{124d}, y_{124d})$. Controller 104 may be configured to do so using a variety of techniques, including the use of lookup tables that provide the horizontal and vertical pixel positions corresponding the horizontal and vertical physical positions, using a formula to convert between the physical and pixel positions or using any other method. Controller 104 provides the digital position $P_{124d}$ at the interface 148.

Figure 4:
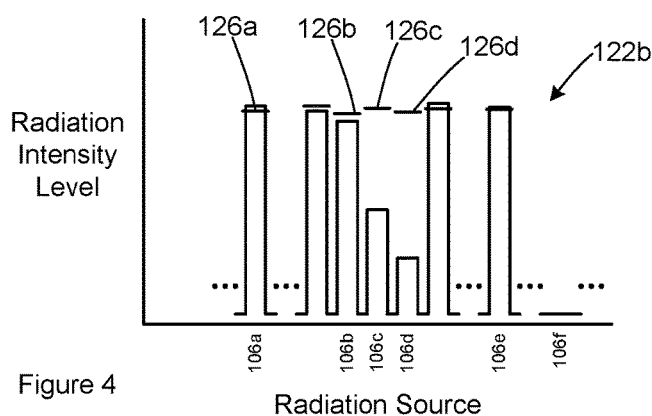
FIG. 4 illustrates a radiation intensity signal according to yet another embodiment.

Reference is made to FIGS. 1 and 4. In another embodiment, the controller 104 is configured or programmed differently to estimate the position $P_{124a}$ of the radiation blocking object 124 in a different manner. In this embodiment, the intensity signals 122 are used to more precisely estimate the angular position of the radiation blocking object 124 relative to each radiation sensor 102 and a side of the frame 108.

FIG. 4 illustrates a portion of a radiation intensity signal 122*b* when controller 104 is configured according to this embodiment. In this embodiment, the controller 104 establishes a baseline intensity level for each radiation source in combination with each radiation sensor. For each radiation source, controller 104 samples the radiation intensity level from radiation sensor 102*b* while the radiation source is on, and in the absence of a radiation blocking object to generate a baseline intensity level 126. The baseline intensity levels for radiation source 106*a* and 106*b*-106*d* are shown.

In this embodiment, during startup of system, the baseline intensity level is initially determined for each radiation source, with respect to each radiation sensor from which the radiation source is visible (i.e. if there is a direct path between the radiation source and the radiation sensor). An initial set of samples of the intensity signal are discarded while the system is starting up. For a selected time period following this initial start-up period, the radiation intensity level is sampled while the radiation source is on. The radiation intensity level is recorded and an average intensity level is determined for the radiation source at each radiation sensor. For example, if each radiation source is activated 50 times per second, the baseline intensity level may be calculated using the first 25 samples for each radiation source, at each radiation sensor, representing half of a second. In other embodiments, the baseline intensity level may be calculated over more or fewer samples, or for a longer period or shorter period. The baseline intensity level for each radiation sensor inherently takes into account ambient and other conditions affecting the amount of radiation that reaches the radiation sensor when a particular radiation source is switched on. Such other conditions include the amount of radiation emitted by each radiation source, the physical distance between the radiation source and the radiation sensor and may also include the manner in which system 100 is used.

The baseline intensity level calculated for each radiation source 106, with respect to each radiation sensor 102, may be updated over time. For example, a moving average of some of the radiation intensity readings over a recent time period may be calculated to refine the baseline level as ambient and other conditions change. Some radiation intensity readings may not be used to calculate the updated baseline intensity level. For example, every tenth or twentieth radiation intensity reading may be used to calculate the moving average for each baseline intensity level. This reduces the amount of data that must be stored to calculate a baseline intensity level corresponding to a longer time period and also reduces the computation time required in the controller to address this task. Typically, the baseline intensity level will be calculated for a recent period from a part of a second to a few seconds or tens of seconds. When the path between a radiation source 106 and a radiation sensor 102 is blocked the radiation intensity level for that source at that sensor will be significantly reduced, although ambient radiation and some radiation may still reach the radiation sensor around the radiation blocking object. The controller may exclude radiation intensity levels below a certain threshold compared to the current baseline intensity level when refining the baseline intensity as is further described below. Various other methods for calculating a baseline intensity level for each radiation source at each radiation sensor may also be used. In some embodiments, one baseline intensity level may be calculated for a group or all of the radiation sensors. In other embodiments a pre-determined intensity level may be used as the baseline intensity level for some or all of the radiation sources.

In this embodiment, each time a radiation source 106 is activated, the radiation intensity level from each radiation sensor 102 from which the radiation source is visible is sampled and compared to the existing baseline intensity level for that radiation source at that radiation sensor. If the current intensity level is more than some threshold below the baseline intensity level, the percentage difference from the baseline level is calculated. For example, the threshold may be 90% of the baseline intensity level. If the current intensity level is greater than 90% of the baseline level, the current intensity level may be used to further refine the baseline level, or it may be discarded. If it is less than 90% of the baseline level, the processor assumes that the path between the radiation source 106 and the radiation sensor 102 is at least partially blocked. In other embodiments, other threshold levels may be used.

The controller successively activates the radiation sources in a cyclic process. After each cycle of switching on the radiation sources 106 and measuring the radiation intensity level from each radiation sensor for the radiation sources, the controller estimates the position of the radiation blocking object. As noted above, FIG. 4 illustrates the attenuation of several radiation sources 106 relative to its baseline level 126. The current intensity level for radiation source 106a, as measured at radiation sensor 102 is greater than 90% of the baseline intensity level 126a, so it is ignored for the purpose of estimating the position of the radiation blocking object 124, although the current intensity level may be used to refine the baseline level for radiation source 106a as measured at radiation sensor 102b. Similarly, the current intensity level for radiation source 106b is greater than 90% of baseline intensity level 126b, so it is ignored for the purpose of estimating the position of the radiation blocking element, but may be used to refine the baseline level, which would then be slightly higher.

The current intensity levels for radiation sources a 106c and 160d are below 90% of their respective baseline levels 126c and 126d. The current intensity level for radiation source 106c is at 53% of baseline intensity level 126c. The current intensity level for radiation source 106d is at 31% of the baseline intensity level 126d. Controller 104 normalizes these deviations to a total of 100%: the relative attenuation of radiation from radiation source 106c represents 63% of the total attenuation (31%/84%=63%); and the relative attenuation of radiation from radiation source 106d represents 37% of the total attenuation.

The angle φ between the right side 116 and a line 132 between radiation source 102b and radiation blocking object 124 is then estimated as follows. The angle $\varphi_c$ for radiation source 106c is 44°. The angle $\varphi_d$ (not shown) corresponding to radiation source 106d is 42°. In this embodiment, rather than recording the angles themselves, the tan of each angle is recorded. The tan of the angle $\varphi_{124}$ between the left side of the frame 108 and the path between radiation sensor 102b and radiation blocking object 124 can then be estimated as follows:

$$Tan(\varphi_{124}) = 0.63 \cdot tan(44°) + 0.37 \cdot tan(42°)$$
$$= 0.9415.$$

Angle $\varphi_{124}$ is 43.27°

In an embodiment in which the angles themselves are recorded, angle $\varphi_{124}$ may be estimated as follows:

$$\varphi_{124} = 0.63 \cdot 44° + 0.37 \cdot 42°$$
$$= 43.26°.$$

The estimates of angle $\varphi_{124}$ differ due to the non-linearity between an angle and its tangent.

An angle $\theta_{124}$ is calculated for the angle between left side 114 and the line between radiation sensor 102a and the radiation blocking object 124. The two calculated angles $\varphi_{124}$ and $\theta_{124}$ are used to estimate the position $(x_b, y_b)$ of the radiation blocking object 124.

In this manner, controller 104 may use the attenuation of two or more radiation sources as measured at one of the radiation sensors to estimate the angular position of radiation blocking object relative to the left or right side of the frame 108 and one of the radiation sensors 102 by normalizing the relative attenuations of the different radiation sources and then calculating a weighted average of the angle of those sources from the relevant side of the frame and the radiation sensor.

This embodiment may allow the position of the radiation blocking object 124 to be estimated more accurately than the first embodiment by allowing angles θ and φ to be estimated between the specific angles at which the radiation sources 106 are positioned.

System 100 may be used in various configurations to identify the position of various types of radiation blocking objects 124. For example, system 100 may be used with a whiteboard or other display surface. Frame 108 may be attached to the edge or frame of the whiteboard, or may also be the frame of the whiteboard. The radiation blocking object 124 may be a pen used to write on the whiteboard and as the pen is moved about the surface of the whiteboard, its position is estimated by controller 104. Controller 104 may be coupled to (or may be part of) a whiteboard system for recording estimates of the pen's position. By recording successive estimates of the pen's position, information on the whiteboard may be recreated in an electronic form and may be recorded for subsequent use, and it may be displayed or printed. The whiteboard system may include software to calculate the path of movement of the pen between estimated positions and to smooth the calculated path.

As the pen is used to write on the whiteboard, the ink on the whiteboard may change the amount of ambient light reflected on to a radiation sensor 102 and could also change the amount of radiation propagating from a radiation source 106 to a radiation sensor 102, thereby affecting the level of the radiation intensity measured for some or all of the radiation sources 106. In such embodiments, periodically updating the baseline intensity level for some or all of the radiation sources may improve the accuracy of estimates of the position of a radiation blocking object.

In other embodiments, system 100 may be used with a display monitor or screen to form a touchscreen. Frame 108 may be mounted to the display monitor or may be part of the display monitor's housing. The radiation blocking object 124 in this case may be a finger, and as a person moves their finger onto or off of the display monitor, the presence of the finger is detected and its position on the display screen is estimated by controller 104. Controller 104 may be coupled to (or may be part of) a touch screen system (which would also include the display monitor) and may provide estimates of the finger's position to the touch screen system. As a finger is moved about on the display screen, successive estimates of the finger's position can be recorded in the touch screen system to provide an electronic record of the finger's movement and the estimated positions can be displayed on the display monitor. The touch screen system may include software or other components to calculate the path of movement of the finger between its successive estimated positions and to smooth the calculated path. Such a touch screen system, in combination with system 100, would effectively allow a user to write or draw on the display monitor, or to manipulate objects displayed on the display monitor, using the person's finger.

In a touch screen system, the radiation sources 106 and radiation sensors 102 may be located relatively close to the display screen and the amount of radiation incident on the radiation sensors may vary as the information displayed on the display screen changes. In such embodiments, it may also be beneficial to update the baseline intensity level for some or all of the radiation sources.

Figure 5A:
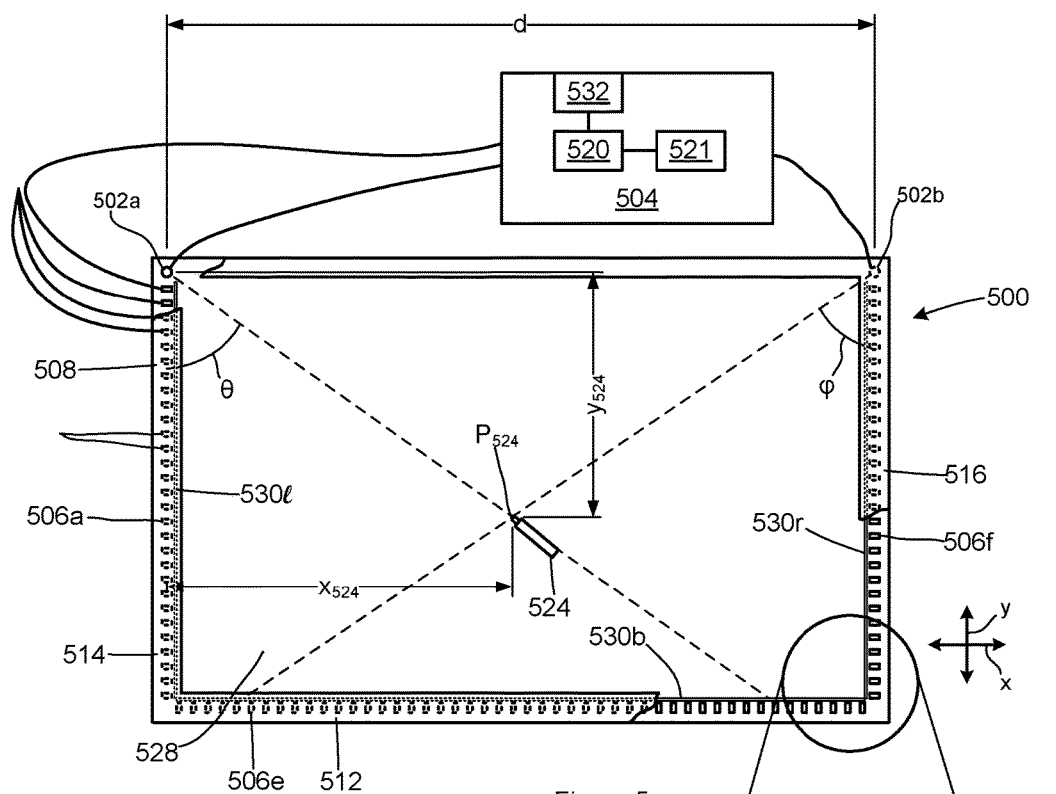
FIGS. 5a and 5b illustrate another embodiment.
Figure 5B:
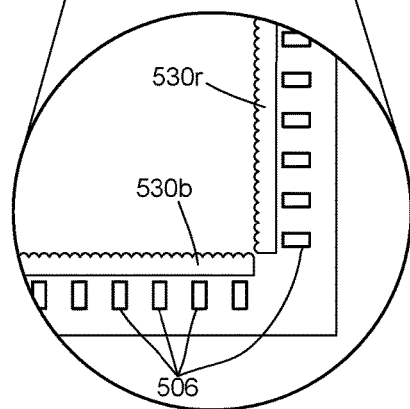

Reference is next made to FIGS. 5a and 5b. FIG. 5a illustrates another system 500 for estimating the position of a radiation blocking object 524. FIG. 5b illustrates the bottom right corner of system 500 in greater detail. System 500 is largely similar to system 100 and corresponding elements are identified with corresponding reference numerals. System 500 includes diffusers 530 mounted adjacent to the radiation sources 506. Diffusers 530 diffuse radiation emitted by the radiation sources, thereby smoothing the amount of radiation apparently emitted along the left, bottom and right sides of the frame 508 by the radiation sources, as viewed from the radiation sensor 502. In this embodiment, the angular position of the radiation blocking object 524 relative to the left and right sides of the frame and the radiation sensors is estimated as described above in relation to system 100. The inventors have found that diffusing the radiation emitted by radiation sources 506 can provide a more accurate estimate of the radiation blocking object's position.

Various materials are suitable for use as diffusers 530, including slightly clouded or translucent plastics or other materials that diffuse but do not excessively scatter radiation from the radiation sources such that it cannot accurately be measured by the radiation sensors 102. In some embodiments, optical grade diffusers which diffuse, but do not substantially block the radiation passing through the diffuser, may be used effectively, including diffraction gratings, lenticular diffusers and lenticular diffraction gratings may be used for the diffusers 530. FIG. 5b illustrates a continuous lenticular diffuser 530b installed on the bottom side 512 of frame 508 and a continuous lenticular diffuser 530r installed on the right side 516 of frame 508.

Figure 6:
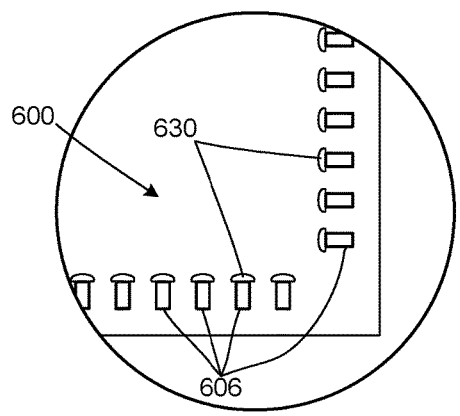
FIG. 6 illustrates another embodiment.

FIG. 6 illustrates a portion of another embodiment 600, corresponding to the portion of system 500 illustrated in FIG. 5b. In system 600, individual diffusers 630 are installed adjacent each radiation source 506.

In some embodiments of the invention, the controller may vary the intensity of radiation emitted by some or all of the radiation sources. This may be done to vary the measured intensity level for a radiation source at the radiation sensors, to overcome the effect of ambient light, to reduce power consumption by the system, or for other reasons.

In the embodiments described above the frame is rectangular and the radiation sensors are mounted in two corners of the frame. In other embodiments, the frame may have a different shape. For example, the present invention may be used with a bulletin board or other object that has any regular or irregular shape and the frame may be shaped and sized to fit on or over the underlying object. Sensors may be positioned at various places on the frame, including along the sides (which may be straight or curved) of the frame. In each case, the position of each sensor and of the radiation sources visible from the sensor are used geometrically to identify the presence and position of a radiation blocking object.

In some embodiments with rectangular or other frame shapes, additional sensors may be used. For example, additional sensors could be added at the bottom left and right corners of system 100 (FIG. 1) and 500 (FIG. 5a). In some embodiments, additional radiation sources could be added along the top side 110 of the frame. In some embodiments, additional information about the position of the radiation blocking object 124 or 524 from the additional sensors may be combined to provide a more accurate estimate of the position of the radiation blocking object.

In some embodiments, with rectangular or other frame shapes, sensors may be placed along the sides of the frame. The positioning of radiation sensor and radiation sources may depend on the portion of an underlying system (such as a whiteboard, display monitor or other system) in which a radiation blocking object is to be detected.

In various embodiments, a system according to the present invention may include a bezel (which may be part of the frame) that conceals some or all of the components of the system including the radiation sources, the radiation sensors and diffusers. In some embodiments, the bezel or the frame or both may be painted with radiation absorbing paint or otherwise adapted to reduce the amount of radiation that is reflected toward the radiation sensors from the bezel or the frame or both.

In some embodiments, an optical filter may be placed between some or all of the radiation sensors and some or all of the radiation sources. For example, an optical filter could be installed around the radiation sensors to reduce the amount of ambient and other undesirable radiation that is incident on the radiation sensors.

Figure 7:
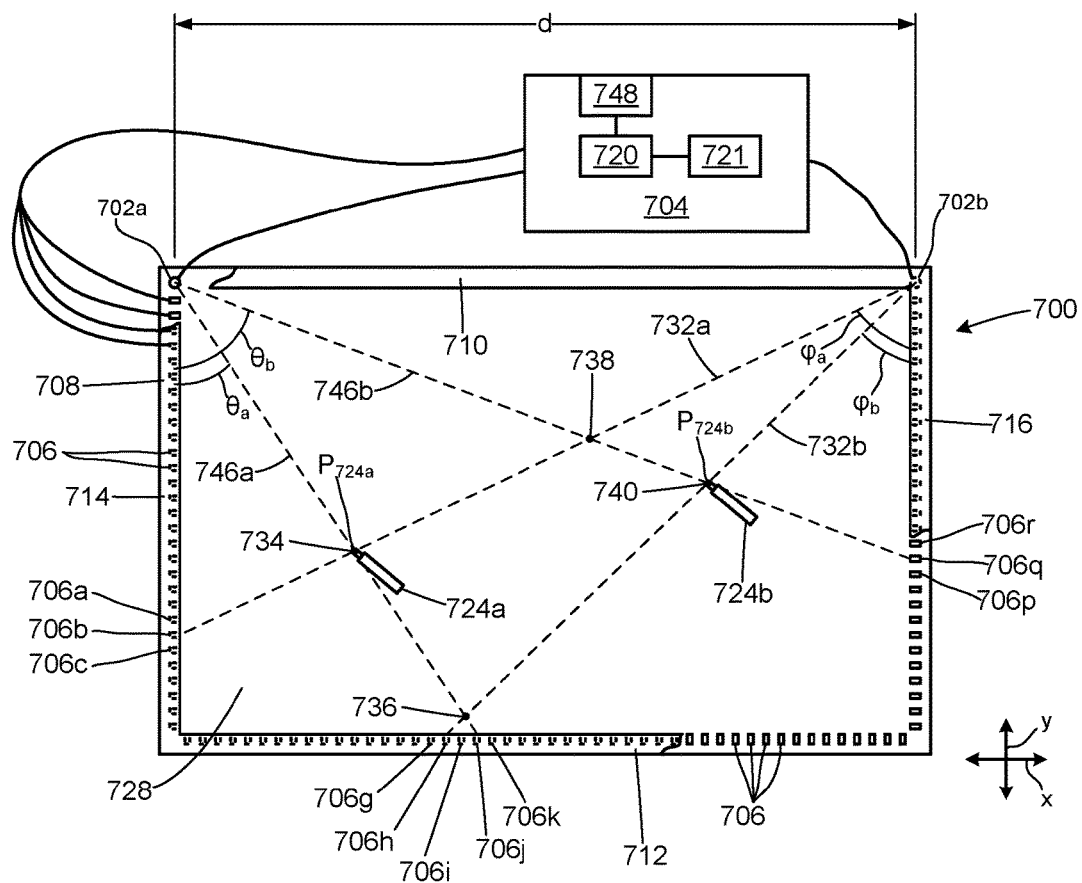
FIG. 7 illustrates yet a further embodiment with several radiation blocking embodiments in a position.

Reference is next made to FIG. 7, which illustrates a system 700 for simultaneously tracking the position of two or more radiation blocking objects. System 700 is a touchscreen that operates as both an input device and an output device for a connected computer or other external system.

System 700 is similar in construction to systems 100 and 500, and corresponding components are identified by similar reference numerals. System 700 may be used as an electronic whiteboard system or an LCD touch screen.

System 700 includes a pair of radiation sensors 702a, 702b, a controller 704, a plurality of radiation sources 706 mounted on a frame 708 and an LCD display screen. Sources 706 are mounted on the left side 714, bottom side 712 and right side 716 of the frame 708. Frame 708 also has a top side 710. Radiation sensor 702a is mounted at the top left corner of frame 708 and radiation sensor 702b is mounted at the top right corner of the frame 708. Radiation sensors 702a and 702b are separated by a distance d. Controller 704 is coupled to radiation sensors 702 and radiation sources 706. Controller 704 controls the radiation sources and receives radiation intensity levels from the radiation sensors as described above in relation to system 100.

The sides of frame 708 are parallel to the axes of an x-y plane. A pair of radiation blocking objects 724a and 724b are positioned such that each of the radiation blocking objects 724 obstructs the straight line path between at least one of the radiation sources 706 and the radiation sensors 702.

The LCD display screen is mounted within frame 708 and has a display surface 728. The line of sight paths along which radiation from the radiation sources 706 to the radiation sensors 702 pass above the display surface, and are generally parallel to the display surface. The LCD display screen has a resolution of X horizontal pixels by Y vertical pixels. For example, in some embodiments the LCD display screen may have a resolution of 1280×1024 pixels or 1920×1080 pixels. Many other pixel resolutions are possible for various display panels. In various embodiments, any type of display panel may be used in place of an LCD panel. Typically, frame 708 will be mounted to the display panel, or will also form part of the housing of the display panel.

System 700 may optionally include diffusers, such as the diffusers 530 and 630 illustrated in FIGS. 5 and 6.

System 700 will typically include several input/output interfaces. In the present embodiment, controller 704 is coupled to a computing device through an interface 748 to transmit the position of radiation blocking objects to the computing device. For example, interface 748 may be a serial interface such as a USB interface or a parallel interface. The LCD display is coupled to the computing device to receive video signals, which are displayed on the display 728, through a video signal interface (not shown).

Figure 8:
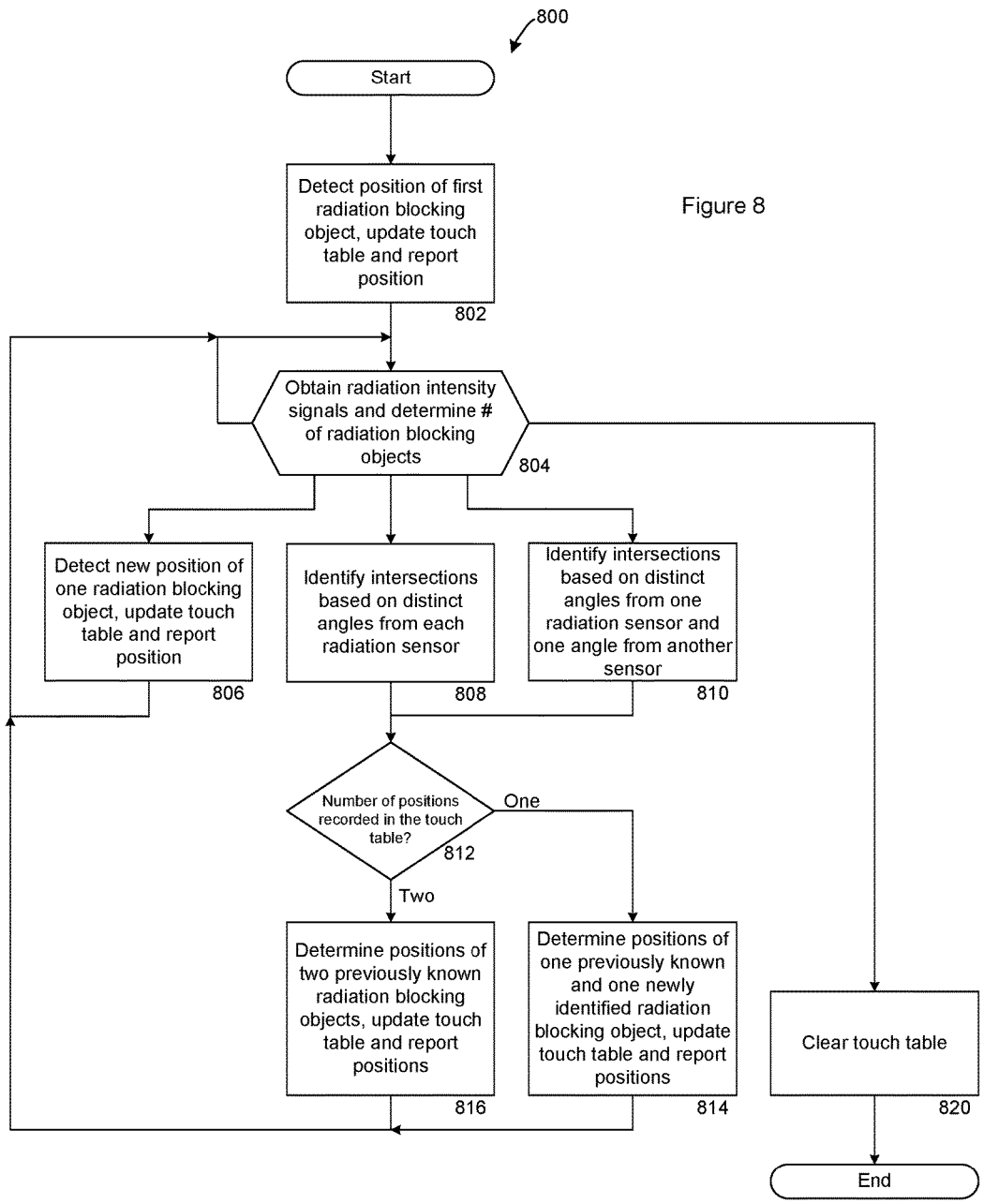
FIG. 8 illustrates a method of identifying or estimating the positions of radiation blocking objects on a surface using the system of FIG. 7.

Reference is next made to FIG. 8, which illustrates a method 800 for identifying or estimating the positions of radiation blocking objects 724a and 724b. In this embodiment, method 800 is performed by controller 704. Prior to the start of method 800, no radiation blocking object is positioned on the display surface 728.

Method 800 begins in step 802, in which a first radiation blocking object 724a is initially positioned on the display surface 728. Instructions for performing method 800 are recorded in memory 721. Controller 720 accesses the stored instructions and executes the instructions to perform the method.

Method 800 will be explained by way of example and the for purposes of the example, the first radiation blocking object is initially placed on the display surface in the position shown in FIG. 7. In this step, radiation blocking object 724b is not placed on the display surface 728.

Figure 9A:
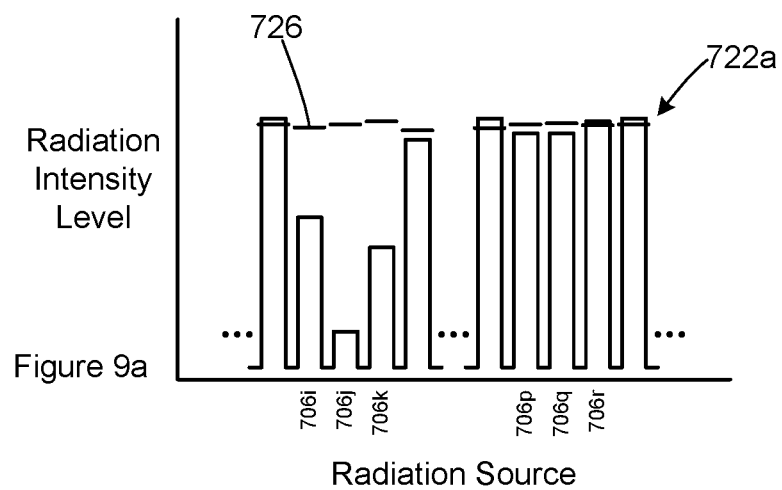
FIGS. 9a and 9b illustrate radiation intensity signals corresponding to one of the radiation blocking objects of FIG. 7.
Figure 9B:
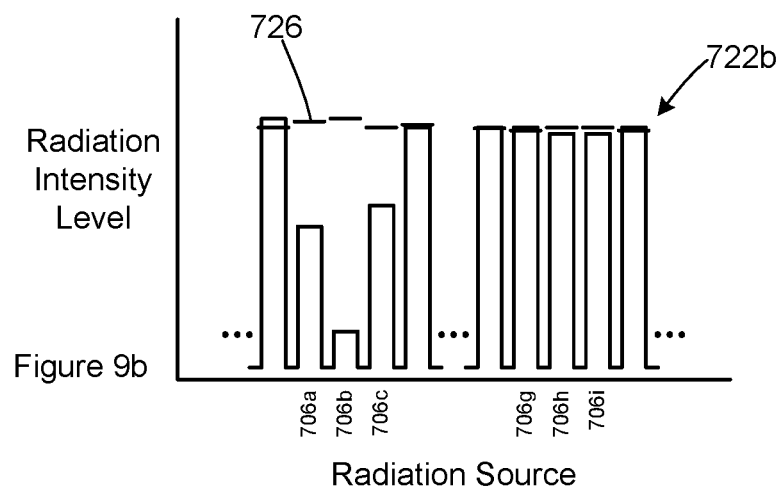

Reference is made to FIGS. 9a and 9b, which illustrate radiation intensity signals 722a and 722b after radiation blocking object 724a has been placed on the display surface 728.

Radiation intensity signal 722a illustrates that radiation intensity levels from radiation sources 706i-706k are attenuated at radiation sensor 702a. Radiation intensity signal 722b illustrates that radiation intensity levels from radiation source 706a-406c are attenuated at radiation sensor 702b.

Controller 704 uses radiation intensity signal 722a and 722b as described above in relation to system 100 to estimate the physical position $P_{724a}(x_{aa}, y_{aa})$ of radiation blocking object 724a. Position $P_{724a}(x_{aa}, y_{aa})$ is physical (or analog) position calculated relative to positions of the sensors 702 and based on angles $(\theta_a, \varphi_a)$.

Controller 704 maintains a touch table, in which the last known position of each radiation blocked object that has been detected on the surface 728 is recorded. Typically, the touch table may be a set of variables or part of a database that is stored in memory 721. In the present embodiment, the touch table includes two slots, A and B, for recording the last known positions of up to two radiation blocking objects. In other embodiments, the touch table may include more than two slots, or may include a variable number of slots.

Controller 704 records the physical position $P_{724a}$ of the first radiation blocking object 724a in slot A in the touch table:

| Slot | X Position | Y Position |
|------|------------|------------|
| A    | $x_{aa}$   | $y_{aa}$   |
| B    | —          | —          |

Physical position $P_{724a}(x_{aa}, y_{aa})$ corresponds to a pixel (or digital) position $P_{724d}(x_{ad}, y_{ad})$ on the LCD display 728. Controller 704 converts the physical position $P_{724a}$ to the corresponding pixel position $P_{724d}$, and provides the pixel position $P_{724d}$ at interface 748.

Method 800 then proceeds to step 804. In step 804, Controller 704 operates radiation sources 706 and sensors 702 to sequentially obtain radiation intensity levels associated with radiation sources 706 from each radiation sensor 702. The radiation intensity levels from each radiation sensor are combined into a radiation intensity signal 722. Controller 704 analyzes each radiation intensity signal 722 to determine the number of radiation blocking objects that are represented in each of the radiation intensity signals.

In this embodiment, up to two radiation blocking objects may be placed on surface 728.

Figure 10A:
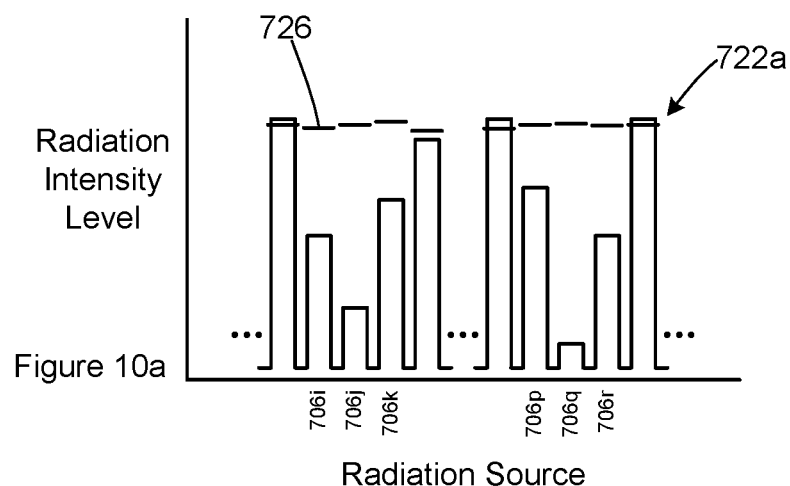
FIGS. 10a and 10b illustrate radiation intensity signals corresponding to both of the radiation blocking objects of FIG. 7.
Figure 10B:
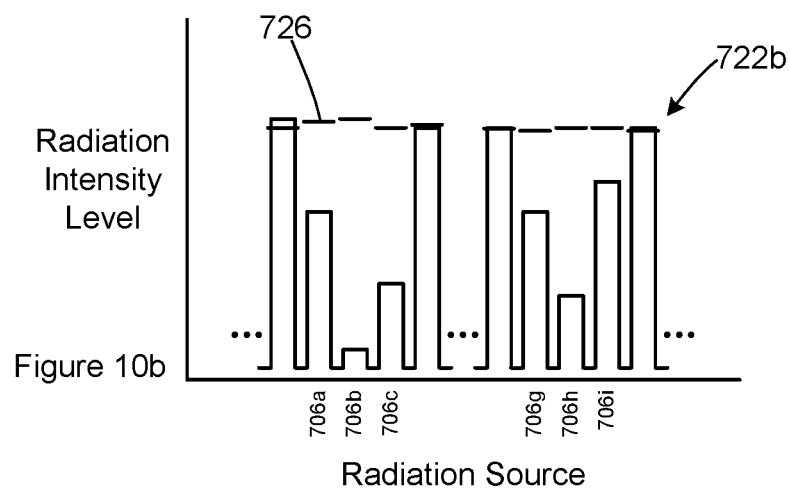

Reference is made to FIGS. 10a and 10b, which illustrate example radiation intensity signals 722a and 722b when two radiation blocking objects 724a and 724b are placed on surface 728. Each of the radiation intensity signals 722a and 722b has two distinct ranges of radiation intensity levels that are attenuated at each of the radiation source 702. (A radiation source for which the radiation intensity level is attenuated may be referred to as an attenuated radiation source.) Each range of attenuated radiation intensity levels corresponds to a separate radiation blocking object 724. The ranges of attenuated radiation intensity levels are separated by at least one radiation source that is not attenuated. For example, and referring also to FIG. 7, in radiation intensity signal 722a, radiation intensity levels for radiation sources 706i-706k and 706p-706r are attenuated at radiation sensor 702a. The attenuation of radiation sources 706i-706k corresponds to radiation blocking object 724a. The attenuation of radiation sources 706p-706r corresponds to radiation blocking object 724b. Controller 704 is configured to identify the two distinct ranges of attenuated radiation sources by identifying at least one radiation source between the ranges that is not attenuated. In some situations, a range of attenuated radiation sources may consist of a single attenuated radiation source.

Figure 11:
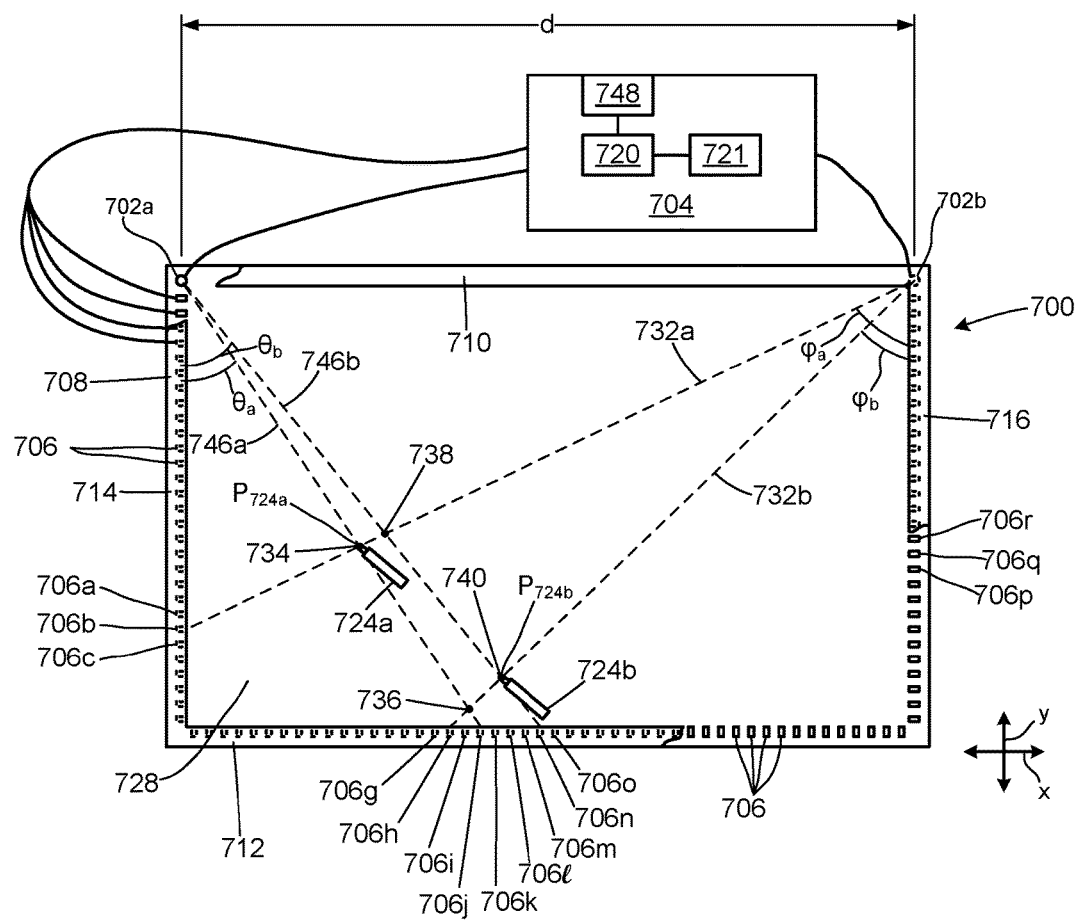
FIG. 11 illustrates the system of FIG. 7 with the radiation blocking objects in a different position.
Figure 12A:
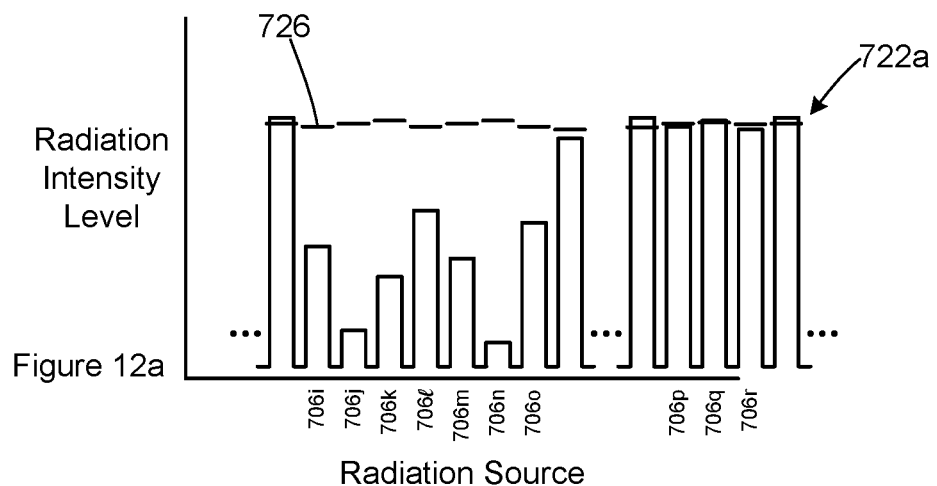
FIGS. 12a and 12b illustrate radiation intensity signals corresponding to FIG. 11.
Figure 12B:
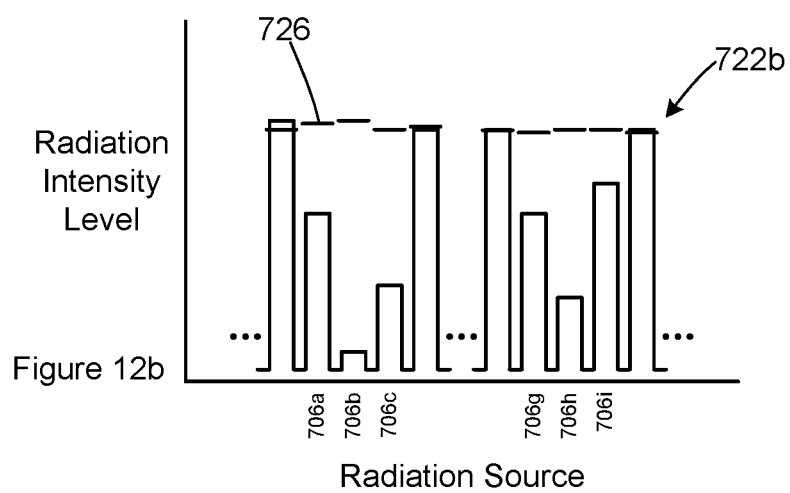

Reference is made to FIGS. 11, 12a and 12b, which illustrate another condition in which two radiation blocks have been placed on surface 728. In FIG. 11, radiation blocking objects 724a and 724b are positioned such that angles $\theta_a$ and $\theta_b$ are separated by a relatively small angle.

FIG. 12a is a radiation intensity signal 722a which illustrates that the radiation blocking objects 724a and 724b have an overlapping effect on the attenuation of radiation intensity levels from one or more radiation sources. Radiation blocking object 724a appears to attenuate radiation from radiation sources 706i-706l. Radiation blocking object 724b appears to attenuate radiation from radiation sources 706l-706o. Controller 704 is configured to distinguish the two ranges of attenuated radiation signals by identifying two distinct minima in the radiation intensity signal, separated by at least one radiation intensity value that is higher than either of the minima. For example, in FIG. 12a, radiation intensity levels for radiation sources 706*j* and 706*n* are local minima. These local minima are separated by several radiation intensity levels that are higher than either minima. In various embodiments, the controller 704 may be configured to identify two distinct ranges in various ways. In some cases, a range of attenuation radiation intensity levels may have only a single attenuated radiation source. For example, in some embodiments, the controller 104 may be configured to identify at least one radiation intensity level between local minima radiation intensity levels that exceed the minima by some predetermined about or ratio. In some embodiments, the controller may be configured to require at least two (or a high number) of radiation intensity values between local minima.

FIG. 12*b* illustrates a radiation intensity signal 722*b* corresponding to the positions of radiation blocking object 724*a* and 724*b* in FIG. 11. Radiation intensity signal 722*b* includes two distinct regions of the attenuated radiation intensity levels at radiation sources 706*a*-706*c* and 706*g* to 706*i*. The two ranges are separated by one or more radiation intensity levels that are not attenuated. Controller 704 is configured to distinguish the two ranges of attenuated radiation intensity levels as described above in relation to FIGS. 10*a* and 10*b*.

Controller 704 is thus configured to identify to ranges of attenuated radiation sources in each of the radiation intensity signals illustrated in FIGS. 10*a*, 10*b*, 12*a* and 12*b*.

Figure 13:
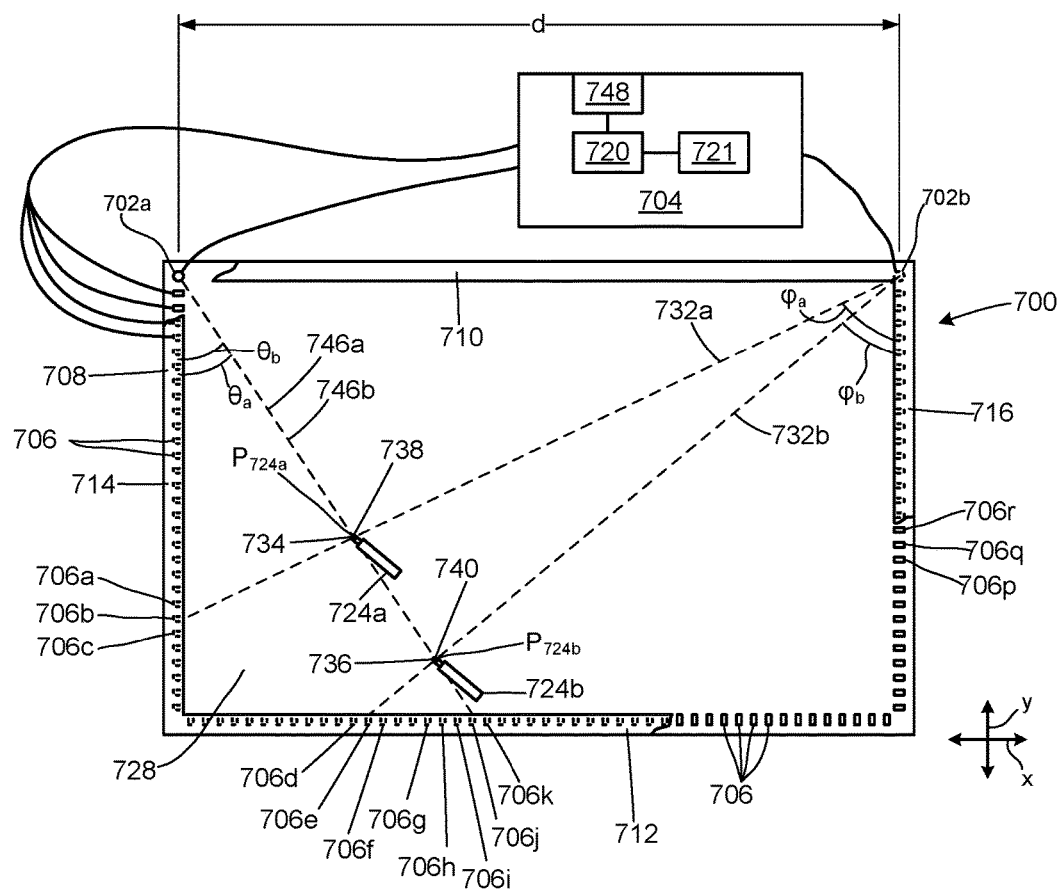
FIG. 13 illustrates the system of FIG. 7 with the radiation blocking objects in a different position.
Figure 14A:
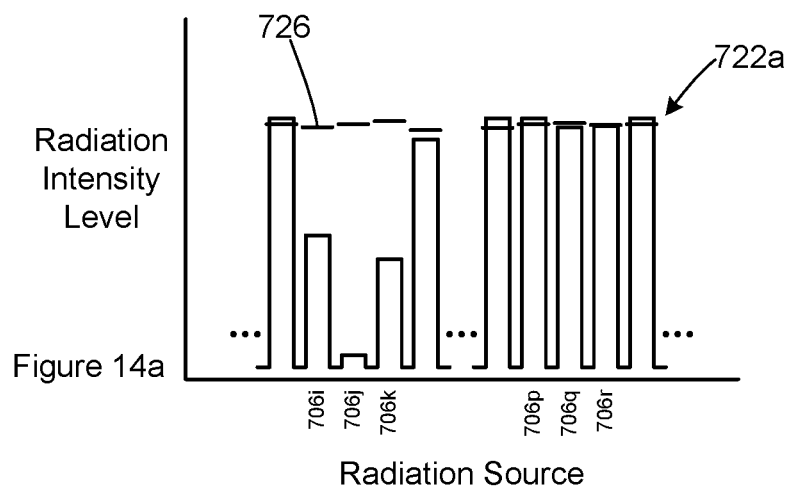
FIGS. 14a and 14b illustrate radiation intensity signals corresponding to FIG. 13.
Figure 14B:
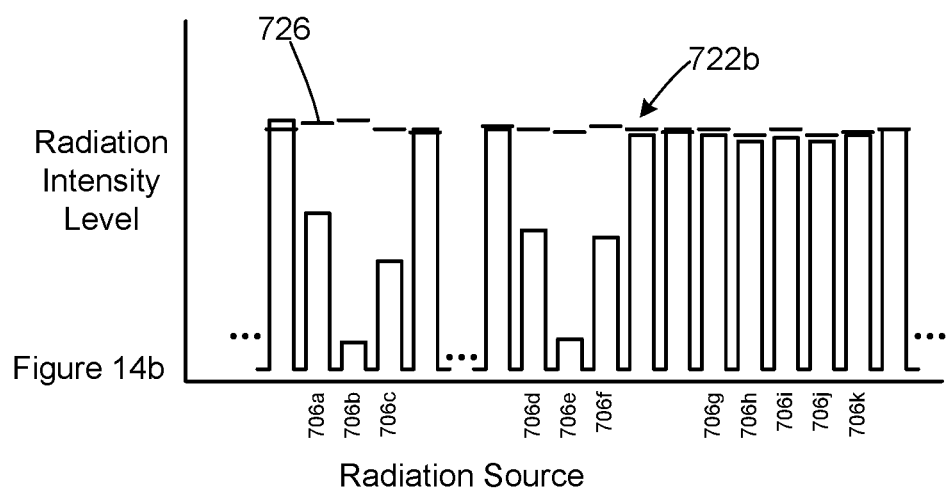

Reference is next made to FIGS. 13, 14*a* and 14*b*, which illustrate another condition in which two radiation blocking objects 724*a* and 724*b* have been placed on the surface 728.

In FIG. 13, the two radiation blocking objects 724*a* and 724*b* are generally collinear with radiation sensor 702*a*. Radiation emitted by radiation source 706*j*, which is also generally collinear with the radiation blocking objects, is at least partially blocked by radiation blocking object 724*b* from reaching radiation sensor 702*a*. Radiation blocking object 724*a* may block additional radiation from radiation source 706*j* from reaching radiation source 702*a*, but radiation blocking object 724*a* is at least partially in the shadow of radiation blocking object 724*b*.

FIG. 14*a* illustrates a radiation intensity signal 722*a* corresponding to the positions of the radiation blocking object 724*a* and 724*b* in FIG. 13. The radiation intensity levels for radiation sources 706*i*-706*k* are attenuated by radiation blocking objects 724*a* and 724*b*. Radiation intensity signal 722*a* is similar to a radiation intensity signal resulting from a single radiation blocking object on the surface 728. Controller 704 analyzes radiation intensity signal 722*a* and is able to identify only one apparent radiation blocking object.

FIG. 14*b* illustrates a radiation intensity signal 722*b* corresponding to the positions of radiation blocking object 724*a* and 724*b* in FIG. 13. Radiation intensity signal 722*b* includes two distinct regions of the attenuated radiation intensity levels at radiation sources 706*a*-706*c* and 706*d* to 706*f*. The two ranges are separated by one or more radiation intensity levels that are not attenuated. Controller 704 is configured to distinguish the two ranges of attenuated radiation intensity levels as described above.

Controller 704 thus determines whether each of radiation intensity signals 722*a* and 722*b* obtained in this step 804 appears to contain zero, one or two ranges of attenuated radiation sources.

Method 800 continues from step 804 depending on the number of radiation blocking objects identified in the radiation intensity signals as follows:

if each of the radiation intensity signals 722 contains one range of attenuated radiation sources (as illustrated in FIGS. 9*a* and 9*b*), then method 800 proceeds to step 806;

if both of the radiation intensity signals 722 contains two ranges of attenuated radiation sources (as illustrated in FIGS. 10*a* and 10*b* and in FIGS. 12*a* and 12*b*), then method 800 proceeds to step 808;

if either one of the radiation intensity signals 722 contains two ranges of attenuated radiation sources and the other radiation intensity signal contains one range of attenuated radiation sources (as illustrated in FIGS. 14*a* and 14*b*), then method 800 proceeds to step 810; and if both of the radiation intensity signals 722 contains zero ranges of attenuated radiation sources, method 800 proceeds to step 820; and otherwise, method 800 returns to step 804;

In step 806, controller 704 determines the position of a radiation blocking object 724 on the display surface 728. Controller 704 calculates an angle θ and an angle φ corresponding to the weighted average attenuation in the respective ranges of attenuated intensity levels in each of the radiation intensity signals 722*a* and 722*b*. A radiation blocking object 724 is deemed to be located at the intersection point of a pair of lines 746 and 732 corresponding to the angles θ and φ and the positions of the radiation sensors 702*a* and 702*b*, as described above.

If only one position corresponding to one radiation blocking object is recorded in the touch table, the intersection point is deemed to be the new physical position of the radiation blocking object. The new position is recorded in the touch table in place of the previously recorded position. The controller converts the physical position of the radiation blocking object into a corresponding pixel position, which is then provided at the interface 748.

If two positions corresponding to two radiation blocking objects are recorded in the touch table, the controller determines which of the previously recorded positions is closest to the intersection point. The intersection point is deemed to be the new position of the radiation blocking object corresponding to the closest previously recorded position, which is replaced in the touch table with the position of the intersection point. The controller converts the physical position of the radiation blocking object into a corresponding pixel position, which is then provided at the interface 748.

The further previously recorded position is deleted from the touch table.

Method 800 then returns to step 804.

Reference is additionally made to FIGS. 7, 10*a* and 10*b*.

In step 808, controller 704 determines various points at which the radiation blocking objects 724 may be positioned based on the two ranges of attenuated radiation sources identified in each of the radiation intensity signals 722*a* and 722*b* in step 804.

For example, In radiation intensity signal 722*a*, radiation sources 706*i*-406*k* and 706*p*-406*r* are attenuated at radiation sensor 702*a*. The two ranges of attenuated radiation sources are separated by at least one radiation source that is not attenuated.

Controller 704 analyzes each group of attenuated sensors independently and calculates an angle θa based on a weighted averaging of the attenuation of sources 706*i*-706*k*, as described in relation to angle $\theta_{124}$ above. Angle $\theta_a$ defines a line 746*a* that extends through the position of radiation sensor 702*a*.

Controller 704 also calculates an angle $\theta_b$ based on the attenuation of sources 706p-706r. Angle $\theta_b$ defines a line 746b that extends through the position of sensor 702a.

In radiation intensity signal 722b, radiation sources 706a-706c and 706g-706i are attenuated at radiation sensor 702b. Controller 704 calculates an angle $\varphi_a$ based on the attenuation of sources 706a-706c and an angle $\varphi_b$ based on the attenuation of source 706g-706i. Angle $\varphi_a$ defines a line 732a that passes through the position of sensor 702b. Angle $\varphi_b$ defines a line 732b that passes through the position of sensor 702b.

Line 746a intersects with lines 732a and 732b at points 734 and 736. Line 746b intersects with line 732a and 732b and points 738 and 740. The four intersection points are shown in the following table:

|  | Line 732a | Line 732b |
|---|---|---|
| Line 746a | 734 | 736 |
| Line 746b | 738 | 740 |

The four points 734-740 may be considered in two pairs. The radiation blocking objects 724a and 724b may be either at points 734 and 740 or at points 736 and 738.

Method 800 then proceeds to decision step 812.

In step 810, controller 704 identifies various points at which the radiation blocking objects 724a and 724b may be positioned based on the two ranges of attenuated radiation sources in one of the radiation intensity signals 722 and the single range of attenuated radiation sources in the other radiation intensity signal.

Reference is additionally to made to FIGS. 13, 14a and 14b.

For the radiation intensity signal 722 having two attenuated ranges of radiation sources, each range is analyzed separately to determine two angles θa and θb or φa and φb, as described in relation to step 808. For example, radiation intensity signal 722b in FIG. 14b has two distinct ranges of attenuated radiation sources and the two angles φa and φb illustrated in FIG. 13 are calculated as described above. Two corresponding lines extending from the corresponding radiation sensor 702 are also calculated. In this example, lines 732a and 732b are calculated.

For the radiation intensity signal having only one range of attenuated radiation sources 706, only one corresponding angle θ or φ can be calculated. In this example, radiation intensity signal 722a (FIG. 14a) has only one range of attenuated radiation sources 706i-706k. A corresponding angle θa and line 746a are calculated.

Angle θa is duplicated as angle θb, and line 746a is duplicated as line 746b.

Controller 704 then calculates points 734-740 based on the intersections of lines 746a and 746b with lines 732a and 732b, as described in step 808.

Method 800 then proceeds to step 812.

In step 812, controller 704 determines the number of position recorded in the touch table. If only one position is recorded in the touch table, then method 800 proceeds to step 812. If two positions are recorded in the touch table, then method 800 proceeds to step 814.

Step 814 is performed if the position of one radiation blocking is recorded in the touch table, and one additional radiation blocking object is newly identified, based on at least one of the radiation intensity signals 722a or 722b or both having two ranges of attenuated radiation sources.

Controller 704 determines which points 734 and 740 or 736 and 738 correspond to the two radiation blocking objects 724a and 724b.

Controller 704 determines which point 734-440 is closest to the position recorded in the touch table. In this example, the physical position P1a of radiation blocking object 724a was recorded in slot A of the touch table in step 806. The closest point (among points 734-740) to the previously known position P1a is deemed to be the current position P1a of the first radiation blocking object 724a. Position P1a will correspond to one point in one of the pairs of points (734 and 740 or 736 and 738). The other point in the same pair is deemed to be the position P2a($x_{ba}$, $y_{ba}$) of the second radiation blocking object 724b. For example, in the example illustrated in FIG. 7, the last known position P1a for radiation blocking object 724a is closest to position 734. Radiation blocking object 724a is deemed to be positioned at point 734, and the position P2a of the second radiation blocking object 724b is deemed to be point 740.

Controller 704 updates the touch table with the position P1a of the first radiation blocking object 724a in slot A of the touch table and records the position P2a of the second radiation blocking object 724b in slot B of the touch table:

| Slot | X Position | Y Position |
|---|---|---|
| A | $x_{aa}$ | $y_{aa}$ |
| B | $x_{ba}$ | $y_{ba}$ |

Controller 704 converts the physical positions P1a and P1a of the radiation blocking objects 724a and 724b into corresponding pixel positions P1d and P2d and provides them at interface 748 to a coupled computing device.

Method 800 then returns to step 804.

In step 816, the positions of the first and second radiation blocking object 724 are tracked as they are moved on the display surface 728.

Method 800 reaches step 816 when the touch table has previously been updated with the positions of two radiation blocking object 724 (in either step 814 or 816). The positions of the two radiation blocking objects is updated in the touch table and their respective positions are reported at interface 748.

Controller 704 analyzes each possible combination of movements from the last recorded positions P1a and P2a in the touch table. In this embodiment, the four possible combinations are as follows:

Combination 1: Radiation blocking object 724a moved to position 734; and Radiation blocking object 724b moved to position 740.

Combination 2: Radiation blocking object 724a moved to position 740; and Radiation blocking object 724b moved to position 734.

Combination 3: Radiation blocking object 724a moved to position 736; and Radiation blocking object 724b moved to position 738.

Combination 4: Radiation blocking object 724a moved to position 738; and Radiation blocking object 724b moved to position 736.

For each combination, controller 704 is configured to calculate the total distance that the two radiation blocking objects 724 would move. For example, for combination 3, the first radiation blocking object 724a would move from position P1a to position 736 and the second radiation blocking object 724b would move from position P2a to position 738. The distance that each radiation blocking object may be calculated using standard geometric techniques.

For each combination, the distances that each radiation blocking object would move are summed together. In this example, each combination results in the following total distances:

Combination 1: 0.2 mm
Combination 2: 82.4 mm
Combination 3: 46.5 mm
Combination 4: 85.3 mm Controller 704 is configured to deem the radiation blocking objects to have moved in accordance with the combination that requires the shortest total movement of the two radiation blocking objects. In the present example, this is combination 1. Radiation blocking object 724a is deemed to have moved to point 734. Radiation blocking object 724b is deemed to have moved to point 740. Controller 704 updates the touch table with the new position of each radiation blocking object. Controller 704 converts the new physical positions P1a and P2a of the radiation blocking objects 724a and 724b into corresponding pixel positions P1d and P2d and provides them at interface 748 to a coupled computing device.

Method 800 then returns to step 804.

Method 800 reaches step 820 if both radiation blocking objects have been removed from the display surface 728. The controller deletes all recorded positions in the touch table and may optionally provide an indication at interface 748 that no radiation blocking objects have been detected on the display surface 728.

Using method 800, controller 704 provides successive positions of one or two radiation blocking objects as they are positioned on the display surface 728 and moved about the display surface 728. The method terminates when no radiation blocking object is identified on the display surface.

In system 700 and method 800, the positions of radiation blocking objects are recorded in the touch table as physical positions and the distances between various points are calculated in physical dimensions. In other embodiments, the positions may be recorded and distances may be calculated in pixel dimensions.

The present invention has been described here by way of example only. Various modification and variations may be made to these exemplary embodiments without departing from the spirit and scope of the invention.

The invention claimed is:

1. A system for sensing the position of a radiation blocking object, the system comprising:
a frame;
a plurality of radiation sources mounted to the frame;
a first radiation sensor mounted to the frame, wherein the first radiation sensor is responsive to the intensity of radiation emitted by at least some of the radiation sources and incident on the first radiation sensor to provide a first series of radiation intensity levels;
a second radiation sensor mounted to the frame, wherein the second radiation sensor is responsive to the intensity of radiation emitted by at least some of the radiation sources and incident on the second radiation sensor to provide a second series of radiation intensity levels and wherein the first and second radiation sensors are spaced by a distance;
a controller coupled to radiation sources and the radiation sensors, wherein the controller is configured to:
sequentially and individually activate at least some of the radiation sources;
identify a first set of three or more attenuated radiation intensity levels in the first series of radiation intensity levels;
estimate a first angle relative to the first radiation sensor corresponding to the first set of three or more attenuated radiation intensity levels, wherein the controller is configured to:
estimate the first angle based on a weighted average of the respective angles of the radiation sources corresponding to the first set of three or more attenuated radiation intensity levels relative to the first sensor;
identify a second set of three or more attenuated radiation intensity levels in the second series of radiation intensity levels;
estimate a second angle relative to the second radiation sensor corresponding to the second set of three or more attenuated radiation intensity levels, wherein the controller is configured to:
estimate the second angle based on a weighted average of the respective angles of the radiation sources corresponding to the second set of three or more attenuated radiation intensity levels relative to the second sensor; and
estimate the position of the radiation blocking object based upon the distance, the first angle and the second angle.

2. The system of claim 1 wherein each of the radiation sensors is sensitive to radiation emitted by the radiation sources and provides a radiation intensity level to the controller corresponding to the intensity of radiation incident on the radiation sensor.

3. The system of claim 1 wherein each of the radiation sensors is selected from the group consisting of:
a photosensor;
a photodiode;
a photocell,
a solar cell; and
a photovoltaic cell.

4. The system of claim 1 wherein the frame at least partially surrounds a surface.

5. The system of claim 1 wherein the surface is selected from the group consisting of: a writing surface; and the surface of a display screen.

6. The system of claim 1 further including a bezel and wherein the radiation sources and radiation sensors are mounted within the bezel.

7. The system of claim 1 further including one or more diffusers for diffusing radiation emitted by at least some of the radiation sources.

8. The system of claim 7 wherein the diffusers are selected from the group consisting of:
translucent sheet material;
translucent plastic;
translucent glass;
lenticular diffusers;
diffraction gratings; and
lenticular diffraction gratings.

9. The system of claim 1 wherein:
the frame has first, second, third and fourth sides;
the first radiation sensor is mounted between the first and second sides;
the second radiation sensor is mounted between the first and fourth sides;
radiation sources are mounted on second, third and fourth sides.

10. The system of claim 1 further including an interface coupled to the controller for providing a position of the radiation blocking object to an external device.

11. The system of claim 1 wherein each of the first and second radiation sensors is a single point radiation sensor.

12. The system of claim 1 wherein the controller is configured to sequentially activate each of the radiation sources.

13. The system of claim 1 wherein the controller is configured to activate each of the radiation sources individually.

14. The system of claim 1 wherein:
prior to estimating the first angle, the controller is configured to normalize the relative attenuations of each radiation source in the first set of three or more attenuated radiation intensity levels; and
prior to estimating the second angle, the controller is configured to normalize the relative attenuations of each radiation source in the second set of three or more attenuated radiation intensity levels.

15. A method of estimating the position of a radiation blocking object on a surface, the method comprising:
providing a first radiation sensor and a second radiation sensor;
providing a plurality of radiation sources, wherein:
radiation emitted by at least some of the radiation sources passes across the surface and is incident on the first radiation sensor; and
radiation emitted by at least some of the radiation sources passes across the surface and is incident on the second sensor;
sequentially activating at least some of the radiation sources, wherein at least some of the radiation sources are activated individually;
obtaining a first series of radiation intensity levels provided by the first radiation sensor in response to the radiation emitted by the radiation sources and incident on the first radiation sensor;
obtaining a second series of radiation intensity levels provided by the second radiation sensor in response to the radiation emitted by the radiation sources and incident on the first radiation sensor; and
identifying a first set of three or more attenuated radiation intensity levels in the first series of radiation intensity levels;
estimating a first angle relative to the first radiation sensor corresponding to the first set of three or more attenuated radiation intensity levels, wherein the first angle is based on a weighted average of the respective angles of the radiation sources corresponding to the first set of three or more attenuated radiation intensity levels relative to the first sensor;
identifying a second set of three or more attenuated radiation intensity levels in the second series of radiation intensity levels;
estimating a second angle relative to the second radiation sensor corresponding to the second set of three or more attenuated radiation intensity levels, wherein the second angle is based on a weighted average of the respective angles of the radiation sources corresponding to the second set of three or more attenuated radiation intensity levels relative to the second sensor; and
estimating the position of the radiation blocking object based upon a distance between the first radiation sensor and the second radiation sensor, the first angle and the second angle.

16. The method of claim 15 wherein a radiation intensity signal corresponding to each radiation sensor is assembled by sequentially sampling a radiation intensity level from the radiation sensor while at least some of the radiation sources are sequentially activated.

17. The method of claim 16 wherein the radiation intensity signals are assembled contemporaneously.

18. The method of claim 17 wherein at least one of the radiation sources is activated separately at different intensities to generate a radiation intensity signal corresponding to a first radiation sensor and a radiation intensity signal corresponding to the second radiation sensor.

19. The method of claim 16 wherein the radiation intensity signals are assembled sequentially.

20. The method of claim 16 wherein a first radiation intensity signal corresponding to the first radiation sensor is assembled and then a second radiation intensity signal corresponding to the second radiation sensor.

21. The method of claim 15 wherein estimating the position of the radiation blocking object includes:
identifying a first group of three or more attenuated radiation sources in the first radiation intensity signal;
identifying a second group of three or more attenuated radiation sources in the second radiation intensity signal;
estimating the position of the radiation blocking object based on the position of the first group of attenuated radiation sources relative to first radiation sensor and the position of the second group of attenuated radiation sources relative to the second radiation sensor.

22. The method of claim 21 wherein:
identifying a first group of three or more attenuated radiation sources includes, for at least some of the radiation sources, comparing a radiation intensity level in the radiation intensity signal to a baseline level for the radiation source at the first radiation sensor; and
identifying a second group of three or more attenuated radiation sources includes, for at least some of the radiation sources, comparing a radiation intensity level in the radiation intensity signal to a baseline level for the radiation source at the second radiation sensor.

23. The method of claim 22 wherein:
a radiation source is only included in the first group when the radiation intensity level for the radiation source is below the baseline level for the radiation source at the first radiation sensor by a threshold; and
a radiation source is only included in the second group when the radiation intensity level for the radiation source is below the baseline level for the radiation source at the second radiation sensor by a threshold.

24. The method of claim 15 wherein the each of the first and second radiation sensors is a single point radiation sensor.

25. The method of claim 15 wherein each of the radiation sources is activated sequentially.

26. The method of claim 15 wherein each of the radiation sources is activated individually.

27. The system of claim 15 including:
prior to estimating the first angle, normalizing the relative attenuations of each radiation source in the first set of three or more attenuated radiation intensity levels; and
prior to estimating the second angle, normalizing the relative attenuations of each radiation source in the second set of three or more attenuated radiation intensity levels.

* * * * *